US011335202B2

(12) United States Patent
Cornel et al.

(10) Patent No.: US 11,335,202 B2
(45) Date of Patent: May 17, 2022

(54) ADAPTIVE NETWORK FOR NOTAM PRIORITIZATION

(71) Applicant: The Boeing Company, Chicago, IL (US)

(72) Inventors: Miriam Cornel, Bavaria (DE); Michelle Wenzel, Hesse (DE); Garoe Gonzalez, Hessen (DE); Samantha A. Schwartz, Castle Rock, CO (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 16/861,492

(22) Filed: Apr. 29, 2020

(65) Prior Publication Data

US 2021/0343151 A1 Nov. 4, 2021

(51) Int. Cl.
*G08G 5/00* (2006.01)
(52) U.S. Cl.
CPC ......... *G08G 5/0004* (2013.01); *G08G 5/0091* (2013.01)
(58) Field of Classification Search
CPC .. G08G 5/0004; G08G 5/0091; G08G 5/0013; G08G 5/0026; G06F 16/338; G06F 16/38
See application file for complete search history.

(56) References Cited

U.S. PATENT DOCUMENTS

| 8,970,399 B1 | 3/2015 | Zimmer et al. | |
| 8,973,101 B1 * | 3/2015 | Sampigethaya | G08G 5/0069 726/21 |
| 9,927,807 B1 * | 3/2018 | Ganjoo | H04W 76/15 |

(Continued)

FOREIGN PATENT DOCUMENTS

| CN | 112214616 A * | 1/2021 | ........... G06F 16/288 |
| CN | 112732947 A * | 4/2021 | |

(Continued)

OTHER PUBLICATIONS

"Solution for Information Overload Using Faceted Search—A Review;" Mohammed Najah Mahdi, Abdul Rahim Ahmad, Rosian Ismail, Hayder Natiq, Mohammed Abdulameer Mohammed; IEEE Access (vol. 8, pp. 119554-119585); Jan. 1, 2020. (Year: 2020).*

(Continued)

*Primary Examiner* — Khoi H Tran
*Assistant Examiner* — Jorge O Peche
(74) *Attorney, Agent, or Firm* — Ferguson Braswell Fraser Kubasta PC

(57) ABSTRACT

A computer-implemented method. The method includes receiving a data structure being a network having nodes linked by links. The nodes have corresponding classes representing corresponding distinct notices to airmen (NOTAMs). The nodes are linked such that any given node is linked to at least one other node. The links represent corresponding pre-determined mathematical degrees of relevance between pairs of linked nodes. The links point from a corresponding less relevant node to a corresponding more relevant node. The nodes are pre-ranked in a prioritized order according to the pre-determined mathematical degree of relevance. The method also includes receiving a request to display the NOTAMs on a display device. The method also includes retrieving the NOTAMs associated with the nodes in the prioritized order. The method also includes commanding the NOTAMS to be displayed on the display device in the prioritized order.

21 Claims, 7 Drawing Sheets

(56) References Cited

U.S. PATENT DOCUMENTS

| | | | | |
|---|---|---|---|---|
| 11,263,703 | B2* | 3/2022 | Juban | G06Q 40/12 |
| 2008/0091672 | A1* | 4/2008 | Gloor | G06F 16/338 |
| | | | | 707/999.005 |
| 2011/0040766 | A1* | 2/2011 | Robinson | G06F 16/38 |
| | | | | 707/E17.014 |
| 2012/0274484 | A1* | 11/2012 | Zimmer | G08G 5/0013 |
| | | | | 340/945 |
| 2019/0080617 | A1* | 3/2019 | Idupunur | G08G 5/0091 |
| 2021/0001998 | A1* | 1/2021 | Miller | G08G 5/0013 |
| 2021/0020168 | A1* | 1/2021 | Dame | G06N 3/08 |
| 2021/0134167 | A1* | 5/2021 | Erignac | G08G 5/0086 |
| 2021/0343151 | A1* | 11/2021 | Cornel | G06F 16/338 |

FOREIGN PATENT DOCUMENTS

| | | | | |
|---|---|---|---|---|
| CN | 113570908 | A * | 10/2021 | G06F 16/338 |
| EP | 2778978 | A1 * | 9/2014 | G06F 17/30616 |
| EP | 3751756 | A1 * | 12/2020 | B64C 39/024 |
| EP | 3905067 | A1 * | 11/2021 | G06F 16/338 |
| WO | WO-2008083504 | A1 * | 7/2008 | G06F 17/30696 |

OTHER PUBLICATIONS

"Big data in the air force—Process, use and understand for safety;" Petr Frantis, 2014 IEEE/AIAA 33rd Digital Avionics Systems Conference (DASC) (pp. 8C2-1-8C2-6); Oct. 1, 2014. (Year: 2014).*

"Military GATM: a concept for communication and cooperation using datalink;" C. Raab; 20th DASC. 20th Digital Avionics Systems Conference (Cat. No. 01CH37219) (vol. 2, pp. $7D^5/_1$-$7D^5/_{12}$ vol. 2); Jan. 1, 2001. (Year: 2001).*

Steiner, D., et al., "Semantic Enrichment of DNOTAMS to Reduce Information Overload in Pilot Briefings", 2016 IEEE, Apr. 19, 2016, 13 pages.

Extended European Search Report for related application No. 21154621.3, dated Jul. 26, 2021, 9 pages.

Andersen, r., et al., "Local Graph Partitioning using PageRank Vectors", IEEE, Sep. 24, 2006, 22 pages.

Agirre, E., et al., "Personalizing PageRank for Word Sense Disambiguation", Proceedings of the 12th Conference of the European Chapter of the Association for Computational Linguistics, Mar. 30-Apr. 3, 2009, 9 pages.

Chen, P., et al., "Finding Scientific Gems with Google", Journal of Informetrics 1.1, Apr. 18, 2006, 6 pages.

Ding, Y., et al., "PageRank for Ranking Authors in Co-citation Networks", Journal of the American Society for Information Science and Technology, Jul. 13, 2009, 19 pages.

Jing, y., et al., "VisualRank: Applying PageRank to Large-Scale Image Search", IEEE Transactions on Pattern Analysis and Machine Intelligence, Nov. 1, 2008, 14 pages.

Lawrence, P., et al., "The PageRank Citation Ranking: Bringing Order to the Web", Stanford InfoLab, Jan. 29, 1998, 17 pages.

Bryan, K., et al., "The $25,000,000,000 Eigenvector: The Linear Algebra Behind Google", SIAM Review, May 19, 2011, 60 pages.

* cited by examiner

| ID | DESCRIPTION |
|---|---|
| F777 | FACILITIES AND SERVICES, e.g., FIRE FIGHTING, RESCUE, FUEL AVAILABILITY |
| MXIC | TAXIWAY CLOSED |
| MR77 | RUNWAY |
| MD77 | DECLARED DISTANCES FOR RUNWAY |
| P777 | AIR TRAFFIC PROCEDURES, e.g., ARRIVAL PROCEDURES |
| R777 | AIRSPACE RESTRICTIONS, e.g., TEMPORARY RESTRICTED AREA |
| S777 | AIR TRAFFIC AND VOLMET SERVICES, e.g., FLIGHT INFORMATION SERVICE |
| FA77 | AERODROME, e.g., AERODROME CLOSED |
| I777 | INSTRUMENT AND MICROWAVE LANDING SYSTEM, e.g., LOCALIZER, GLIDE PATH |
| M777 | MOVEMENT AND LANDING AREA |
| C777 | COMMUNICATIONS AND RADAR FACILITIES |
| MRLC | RUNWAY CLOSED |
| MT77 | THRESHOLD FOR RUNWAY |
| W777 | WARNINGS, e.g., GLIDER, BALLOONS, AEROBATICS |
| N777 | TERMINAL AND ENROUTE NAVIGATION FACILITIES |
| L777 | LIGHTING FACILITIES |
| OBCE | OBSTACLE ERECTED |
| A777 | AIRSPACE ORGANIZATION, e.g., FLIGHT INFORMATION REGION, MINIMUM ALTITUDE |
| OL77 | OBSTACLE LIGHTING |

FIG. 4

ADAPTIVE NETWORK FOR NOTAM PRIORITIZATION

BACKGROUND

NOTAMs (Notices to Airmen) are short pieces of temporarily valid information about aircraft operation which may be provided by an aviation regulation administration such as the Federal Aviation Administration (FAA) in the United States of America or the European Union Aviation Safety Agency (EASA) in Europe. Some jurisdictions may use one or more different organizations for issuing NOTAMs.

The aviation regulation administration may gather the information for NOTAMs from a wide variety of sources. NOTAMs may contain weather information, ground condition information, air traffic information, and a wide variety of other types of information useful for operating an aircraft.

Aircraft operators, such as dispatchers, pilots, managers, etc., may review an extensive list of NOTAMs, even for a single flight, which consumes valuable time. However, often, most of the NOTAMs are not relevant for a particular flight. Nevertheless, the whole list of NOTAMs is provided and reviewed. Furthermore, NOTAMs may be homogenous, i.e., appearing similar to each other. Yet further, NOTAMs may be time-sensitive, and issued in an on-going manner. Thus, aircraft operators may consume an undesirable amount of time reviewing all NOTAMs to ensure that relevant NOTAMs are reviewed properly.

When issued, NOTAMs may be disorganized or sorted solely by time of issue. NOTAMs may be continuously updated, sometimes even during a flight. As there is no prioritization by relevance to a particular user or user group, the lack of organization can result in increased undesirable time consumption to ensure that relevant information contained in the NOTAMs will not be overlooked.

SUMMARY

The one or more embodiments provide for a method. The method includes receiving, by a computer processor, a data structure being a network having nodes linked by links. The nodes have corresponding classes representing corresponding distinct notices to airmen (NOTAMs) among at least two NOTAMs. The nodes are linked such that any given node is linked to at least one other node. The links represent corresponding pre-determined mathematical degrees of relevance between pairs of linked nodes in the nodes. The links point from a corresponding less relevant node to a corresponding more relevant node with respect to the pairs of linked nodes. The nodes are pre-ranked in a prioritized order according to the pre-determined mathematical degree of relevance. The method also includes receiving, by the computer processor, a request to display the NOTAMs on a display device. The method also includes retrieving, by the computer processor, the NOTAMs associated with the nodes in the prioritized order. The method also includes commanding, by the computer processor, the NOTAMS to be displayed on the display device in the prioritized order.

The one or more embodiments also provide for a method. The method includes receiving, at a computer processor, notices to airmen (NOTAMs). The method also includes assigning ones of NOTAMs to a corresponding class to form classes. The method also includes arranging the classes into a data structure being a network. Arranging the classes also includes arranging the classes as nodes. Arranging the classes also includes forming links by connecting ones of the nodes to at least one other node in the network via at least one link. Arranging the classes also includes determining corresponding mathematical degrees of relevance between pairs of linked nodes among the nodes. Arranging the classes also includes assigning the corresponding mathematical degrees of relevance to corresponding links between ones of the pairs of linked nodes. Arranging the classes also includes arranging the links to point from a corresponding less relevant node to a corresponding more relevant node with respect to the pairs of linked nodes. The method also includes ranking the nodes in a prioritized order according to the mathematical degrees of relevance.

The one or more embodiments also provide for a system for organizing notices to airmen (NOTAMs). The system includes a computer processor and a data repository in communication with the computer processor. The data repository stores NOTAMs. The data repository also stores a network of nodes being classes to which are assigned the NOTAMs. The data repository also stores links linking the nodes. Ones of the links connect at least two nodes. The data repository also stores mathematical degrees of relevance assigned to ones of the links. The data repository also stores a ranking that establishes the nodes in a prioritized order according to the mathematical degrees of relevance. The system also includes a data structure construction engine executable by the computer processor and configured to assign the NOTAMs to the classes. The data structure construction engine also is configured to arrange the nodes into the network. The data structure construction engine also is configured to determine the mathematical degrees of relevance. The data structure construction engine also is configured to assign the links to corresponding ones of the nodes such that corresponding ones of the links point from a corresponding less relevant node to a corresponding more relevant node with respect to any two selected linked nodes in the nodes. The data structure construction engine also is configured to rank the nodes into the ranking. The system also includes a NOTAM presentation engine executable by the computer processor and configured to receive a request to display the NOTAMs on a display device. The NOTAMs presentation engine also is configured to retrieve the NOTAMs associated with the nodes in the prioritized order. The NOTAMs presentation engine also is configured to command the NOTAMS to be displayed on the display device in the prioritized order. The system also includes the display device for displaying the NOTAMS according to the ranking.

Other aspects of the invention will be apparent from the following description and the appended claims.

BRIEF DESCRIPTION OF DRAWINGS

FIG. 4 shows an example of a list of classes of NOTAMs, in accordance with one or more embodiments.

DETAILED DESCRIPTION

Figure 1:
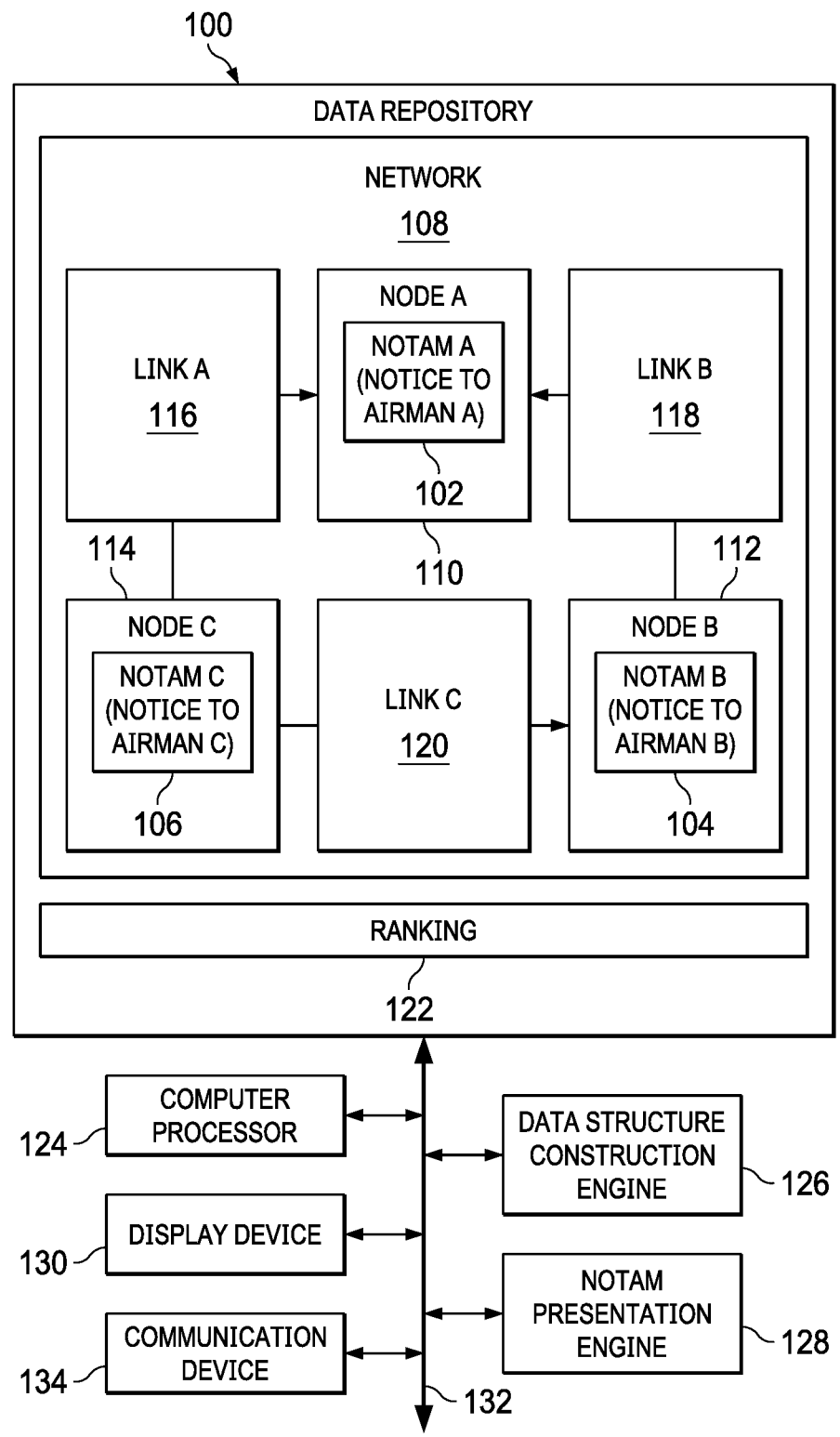
FIG. 1 shows a computing system, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, the one or more embodiments organize NOTAMs in a data structure that takes the form of a network of classes. The data structure is adaptive to user preferences and to the currently updated situation by altering the link structure of the network. A ranking algorithm is then run on the network to prioritize the NOTAMs, resulting in a ranking that takes both user preferences and the current situation into account. The NOTAMs are then sorted by rank and presented to a user in the ranked order. No known system for sorting NOTAMs can provide automatically adaptive prioritization of NOTAMs, based on user preferences, changes in environment, and other changing conditions, as can the network data structure of the one or more embodiments.

In general, the one or more embodiments assign the NOTAMs to corresponding classes. The NOTAM classes serve as nodes for the network data structure. The network data structure is established by linking nodes associated with the NOTAMs with links.

The links of the network data structure represent the knowledge used to rank the classes. The knowledge can be obtained by having subject matter experts compare the relative importance of the classes and then adding directed links for each comparison, pointing from the less important to the more important class node. The result is a network data structure with relatively more relevant nodes having many in-links and relatively less relevant nodes having few or no in-links. The network data structure may be updated by changing how the nodes are linked or by changing the weights assigned to links.

Once the network data structure is built with the desired links, a query to display the NOTAMs is received. In response, the nodes are ranked in order of relevance. The NOTAMs are displayed for use by aircraft operators in an order corresponding to the ranked order of nodes.

Figure 8A:
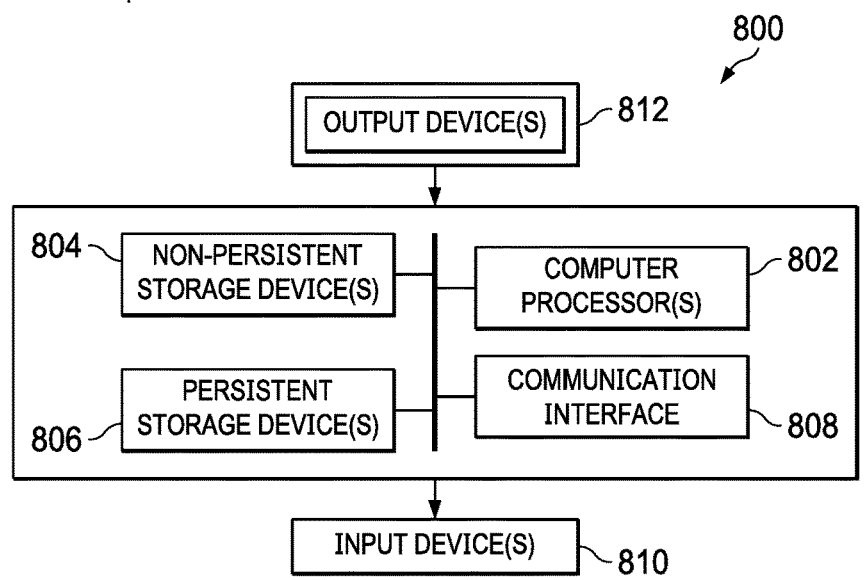
FIG. 8A and FIG. 8B show an example of a computer in a distributed network environment, in accordance with one or more embodiments.
Figure 8B:
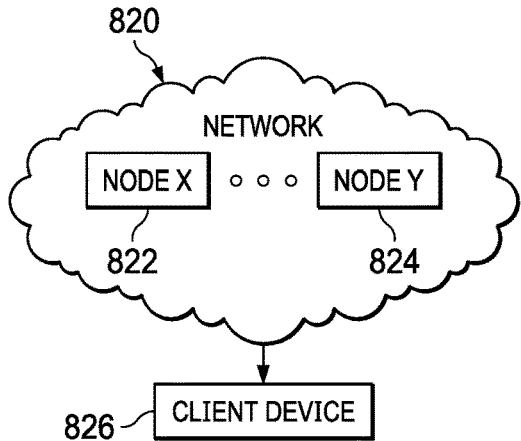

Attention is now turned to the figures. FIG. 1 shows a computing system, in accordance with one or more embodiments. The system shown in FIG. 1 may be implemented using one or more computers in a possibly networked or distributed environment, such as shown in FIG. 8A and FIG. 8B. The system shown in FIG. 1 may be built into an aircraft, and thus one or more components shown in FIG. 1 may be called "aircraft parts." However, the system shown in FIG. 1 may partially or wholly reside in a ground control computing system. Alternatively, some components of the system shown in FIG. 1 may be installed as aircraft parts, and other components of the system shown in FIG. 1 may be installed in ground control computing systems.

The system shown in FIG. 1 may be characterized as a system for generating and using an adaptive network for notam prioritization. Alternatively, the system shown in FIG. 1 may be characterized as a system for organizing notices to airmen (NOTAMs).

In one or more embodiments of the invention, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site. Thus, the data repository (100) may be characterized as a single physical data repository, or as multiple physical data repositories possibly located in different physical locations and networked over a distributed computing environment.

The data repository (100) stores a variety of data. For example, the data repository (100) stores one or more NOTAMs, such as NOTAM A (102), NOTAM B (104), and Notam C (106). As described above, a NOTAM is defined as a "notice to airmen," which is a short piece of temporarily valid information about aircraft operation which may be provided by an aviation regulation administration.

Examples of NOTAMs are shown in FIG. 4. Different types of NOTAMs exist. Types of NOTAMs include Class I NOTAMs, Class II NOTAMs, international NOTAMs, domestic NOTAMs, civil NOTAMs, military NOTAMs, published NOTAMs, Flight Data Center (FDC) NOTAMs, center area NOTAMs, unverified NOTAMs, and "other aeronautical information" NOTAMs.

The type of NOTAM may be used as one of many factors used in determining the relative relevance of a given NOTAM among many NOTAMs with respect to a particular user. With respect to the one or more embodiments, the type of NOTAM may be used as one of many factors which determine a number of in-links to a given class or node in the network data structure described below, or the weight of the links between nodes.

The data repository (100) may also store a network (108). The network (108) is defined as a data structure useable by a computer. Thus, the network (108) may also be referred-to as a network data structure.

The data structure of the network (108) is defined as at least two nodes connected by at least one link. The example shown in FIG. 1 includes but not limited to Node A (110), Node B (112), and Node C (114). Each node may store or be associated with a corresponding NOTAM. Thus, for example, Node A (110) is associated with NOTAM A (102), Node C (114) is associated with Notam C (106), and Node B (112) is associated with NOTAM B (104). In an embodiment, the nodes are computer programming classes. In a more specific embodiment, Q-codes may be used as bases for the classes. However, many classification systems that use classes that can be compared to each other can be used. In an embodiment, there is no limitation to the number of classes. Thus, the NOTAMs may be associated with corresponding a unique classes; one NOTAM per individual class. Stated differently, the network (108) may be characterized as nodes composed of classes to which are assigned the NOTAMs.

As indicated above, the network (108) includes at least one link between two nodes. In the example of FIG. 1, three links are present: Link A (116), Link B (118), and Link C (120). A link is defined as data (or a datum) or metadata (or a metadatum) that indicates a relationship between two nodes.

A link may be directional. For example, Link A (116) may point from Node C (114) to Node A (110). The directionality of a link may indicate a hierarchy of the notes with respect to each other. Continuing the example, because Link A (116) points from Node C (114) to Node A (110), Node A (110) is of higher relevance to a user than Node C (114).

When a link is directional, a link may be characterized as an "out-link" or an "in-link." An "out-link" is a link connected to a first node but pointing towards a second node. An "in-link" is a link connected to a first node but pointing from a second node. Thus, an "out-link" points away from the node in question, but an "in-link" points towards the node in question.

A mathematical degree of relevance may be assigned to a link. In a more specific example, the number "0.95" may be assigned to Link A (116), indicating a very high degree of relevance between Node C (114) and Node A (110), with the number "1" representing perfect relevance or equivalence.

A node is more relevant to another node, relative to other nodes in the network (108), when the information in the NOTAMs are considered related to each other. For example, two NOTAMs in the same class may be deemed more relevant, increasing the mathematical degree of relevance between any two nodes. The relevancy status of a node may change. A node may become more relevant when a user provides input that indicates that a given node is more relevant to the user, thereby increasing the node's degree of mathematical relevance.

In addition, the number of link-ins a node has also increases the relevancy of the node to the user. In FIG. 1, Node A (110) has two node link-ins: a link-in from Node C (114) to Node A (110) and another link-in from Node B (112) to Node A (110). In this example, Node A (110) has more link-ins than Node B (112) (which has one link-in) and has more link-ins that Node C (114) (which has zero link-ins). Nodes with more link-ins may be assigned a higher relevancy and thus rank their corresponding NOTAM higher than the NOTAMs associated with other nodes in the network (108).

From the above, stated differently, the network (108) includes links linking the nodes, with ones of the links connecting at least two nodes in the network (108). In this manner all nodes in the network (108) are connected to at least one other node. Additionally, as shown further with respect to FIG. 5, multiple links may exist between two nodes. Multiple links may indicate that nodes are related to each other in relevance along more than one domain of information, such as for example weather, aircraft type, military information, etc.

Therefore, the data repository (100) also stores a ranking (122), which results from the structure of the network (108). The ranking (122) establishes the nodes in a prioritized order according to the mathematical degrees of relevance.

The system shown in FIG. 1 also includes a processor (124). An example of a processor is shown in FIG. 8A. The processor is in communication with the data repository (100) and possibly other components, as described further below.

The system shown in FIG. 1 has at least one of two other components: a data construction engine (126) and a NOTAM presentation engine (128). The system shown in FIG. 1 may include both the data structure construction engine (126) and the NOTAM presentation engine (128).

The data structure construction engine (126) is defined as software, application specific hardware, or a combination thereof. The data structure construction engine (126) is programmed or otherwise configured to perform a number of functions. The operation of the data structure construction engine (126) is described further with respect to FIG. 3.

Nevertheless, in summary, the data structure construction engine (126) is executable by the computer processor and configured to assign the NOTAMs to the classes. The data structure construction engine (126) is also configured to arrange the nodes into the network. The data structure construction engine (126) is also configured to determine the mathematical degrees of relevance. The data structure construction engine (126) is also configured to assign the links to corresponding ones of the nodes such that corresponding ones of the links point from a corresponding less relevant node to a corresponding more relevant node with respect to any two selected linked nodes. The data structure construction engine (126) is also configured to rank the nodes into the ranking (122).

The NOTAM presentation engine (128) is defined as software, application specific hardware, or a combination thereof. The NOTAM presentation engine (128) is programmed or otherwise configured to perform a number of functions. The operation of the NOTAM presentation engine (128) is described further with respect to FIG. 2.

Nevertheless, in summary, the NOTAM presentation engine (128) is executable by the computer processor and configured to receive a request to display the plurality of NOTAMs on a display device (130). The display device (130) is in communication with the processor (124). The NOTAM presentation engine (128) is also configured to retrieve the NOTAMs associated with the nodes in the prioritized order. The NOTAM presentation engine (128) is also configured to command the NOTAMs to be displayed on the display device (130) in the prioritized order. In this manner, the display device (130) is able to display the NOTAMs according to the ranking (122).

The system of FIG. 1 may also include a bus (132). The bus (132) is a wired or wireless communication system, or a combination thereof, that allows electronic communication between the processor (124), the data repository (100), the display device (130), the data structure construction engine (126), and the NOTAM presentation engine (128). However, in some cases, the data structure construction engine (126) and the NOTAM presentation engine (128) may be loaded into a memory of the processor (124), and thus may be considered part of the processor (124) and not connected to the bus (132). Nevertheless, in some other cases, part or all of the data structure construction engine (126) and the NOTAM presentation engine (128) may take the form of an application specific integration circuit, in which case the data structure construction engine (126) and the NOTAM presentation engine (128) may be physically connected to the bus (132).

The system shown in FIG. 1 may be varied, having more, fewer, or modified components. For example, the system shown in FIG. 1 may also include a communication device (134). The communication device (134) is hardware, software, or a combination thereof that allows the system shown in FIG. 1 to communicate with remote computing systems or remote components. The term "remote" may refer to both physical distance and, in a computer, a logical partition. Examples of a communication device (134) may be a wired connection, a wireless router, a short-range communication system device, etc. In some cases, the communication device (134) may be the bus (132) itself, as the processor (124) may receive data from weather sensors, cabin environment sensors, etc. from other parts of the aircraft connected to the bus (132).

The communication device (134) may be configured to receive additional data related to operation of an aircraft. In this case, the data structure construction engine (126) may be further executable by the computer processor to: associate ones of the additional data to ones of the nodes; modify the data structure by modifying the links based on the additional data; and update the prioritized order according to the modified data structure prior to commanding the NOTAMs to be displayed on the display device (130).

In this manner, the data structure construction engine (126) may continually update the network (108) by adding, deleting, or modifying any of the nodes and/or links. As a result, the network (108) may be concurrently updated whenever an aircraft operator submits a request for NOTAMs to be displayed on the display device (130). Furthermore, user input may be received (possibly via the display device (130) or some other input device) regarding a change of relevancy of a particular NOTAM. When such input is received, the data structure construction engine (126) updates the network (108), and the entire ranking structure of the nodes may be modified so that the most relevant NOTAMs are presented to the user via the display device (130).

The system shown in FIG. 1 may be varied. For example, the system may not include the data structure construction engine (126) used in creating the network data structure. In this case, the network data structure may be provided by some other provider or data system for use by the NOTAM presentation engine (128). Alternatively, the system may not include the NOTAM presentation engine (128). In this case, the network data structure, once produced by the data structure construction engine (126), may be provided to a customer or some other data system for use in ranking the NOTAMs.

Furthermore, additional, fewer, or different arrangements of components may be present. For example, the data repository (100) may store additional network data structures for prioritizing different classes of NOTAMs, in addition to the network (108) shown. Thus, the one or more embodiments shown in FIG. 1 does not necessarily limit the claimed inventions or the other examples provided herein.

While FIG. 1 shows a configuration of components, other configurations may be used without departing from the scope of the invention. For example, various components may be combined to create a single component. As another example, the functionality performed by a single component may be performed by two or more components.

Figure 2:
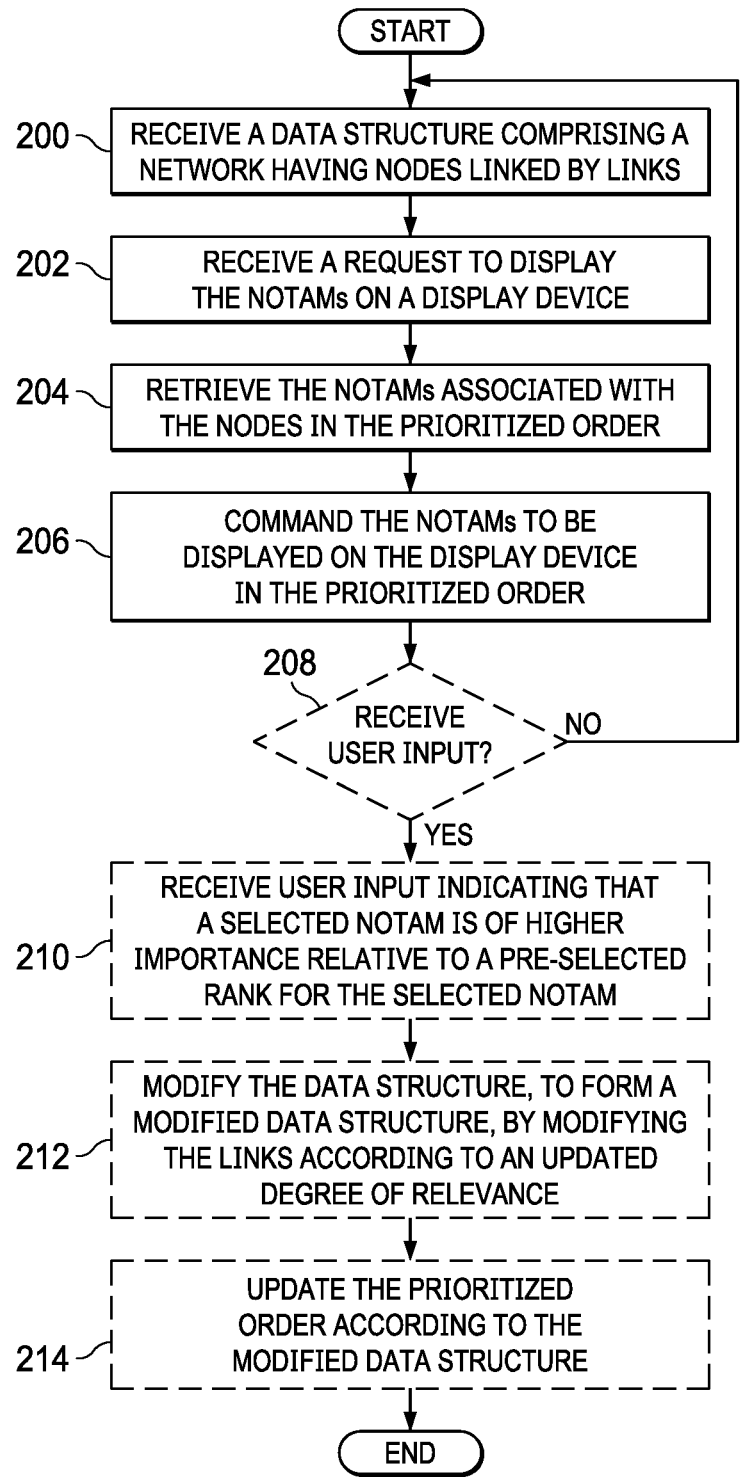
FIG. 2 shows a method for using a data structure to present NOTAMs, in accordance with one or more embodiments.

Attention is now turned to FIG. 2. FIG. 2 shows a method for using a data structure to present NOTAMs, in accordance with one or more embodiments. The method shown in FIG. 2 may be implemented using the system shown in FIG. 1. The method shown in FIG. 2 may be characterized as a method of using a network data structure, such as network (108) of FIG. 1. The method shown in FIG. 2 is performed by a computer processor, though the term "a computer processor" contemplates not only a single processor, but also multiple computer processors in a possibly distributed computing environment.

At step 200, a data structure, in the form of a network having nodes linked by links, is received. The nodes are corresponding classes representing corresponding distinct notices to airmen (NOTAMs) among many NOTAMs. The nodes are linked such that any given node is linked to at least one other node. The links represent corresponding predetermined mathematical degrees of relevance between pairs of linked nodes. The links point from a corresponding less relevant node to a corresponding more relevant node with respect to the pairs of linked nodes. The nodes are pre-ranked in a prioritized order according to the predetermined mathematical degree of relevance.

At step 202, a request is received to display the NOTAMs on a display device. The request may be received via a communication device or a user input device. The request may be generated by a user, or may be generated by another software program which requests a production of ranked NOTAMs.

At step 204, the NOTAMs associated with the nodes are retrieved in the prioritized order. A NOTAM associated with a particular node may be retrieved by a number of different methods, such as by reading the data in the class, using a pointer in the class to retrieve a NOTAM in a data repository, etc. The NOTAMs are retrieved in the prioritized order by retrieving NOTAMs according to the prioritization of the classes in the network data structure. In other words, the ranking assigned to a class is the ranking assigned to the NOTAM corresponding to that class.

At step 206, the NOTAMS are commanded to be displayed on the display device in the prioritized order. The command may be performed by a computer processor, possibly acting in concert with a NOTAM presentation engine, such as shown in FIG. 1. However, the command to display the NOTAMs may include additional formatting commands, such as highlighting NOTAMs with a rank higher than a threshold value, re-formatting the NOTAMs, and or displaying additional information together with the NOTAMs. The method of FIG. 2 may terminate thereafter.

The method shown in FIG. 2 may be varied, including more, fewer, re-arranged, or revised steps. For example, the method of FIG. 2 may be extended by adding optional step 208. At step 208 a determination is made whether user input is received regarding updates to the priority status of a given NOTAM. If "yes" at step 208, then the process continues to step 210; otherwise, if "no," the process terminates.

At step 210, user input is received indicating that a selected NOTAM is of higher importance relative to a pre-selected rank for the selected NOTAM. The user input may be received via a user input device, from either a locally present user input device or a remote input device. For example, a user may click on a NOTAM and drag that NOTAM up on the list, or assign a priority number to the NOTAM.

Continuing the optional steps, at step 212, the data structure is modified, to form a modified data structure, by modifying the links according to an updated degree of relevance. Several techniques exist for modifying the links. For example, the weights assigned to the links may be adjusted. A link that is more relevant according to the user input is assigned a greater weight. In another example, additional links may be formed between the classes in the network data structure associated with the corresponding NOTAMs. Thus, a link may be added between the selected NOTAM to receive increased priority and one or more other NOTAMs that become relevant to the selected NOTAM as a result of selection. In contrast, a selected NOTAM may receive a user-designated lower priority, in which case a link may be deleted or a link may receive a reduced weight.

Stated differently, modifying the data structure may take the form of adding an additional link from a selected node, corresponding to the selected NOTAM, to another node in the data structure to which the selected node was not previously linked. Modifying the data structure may also take the form of adjusting a weight of an existing link from a selected node, corresponding to the selected NOTAM, to another node in the data structure to which the selected node was previously linked. Modifying the data structure may also take the form of adding an additional link from a selected node, corresponding to the selected NOTAM, to another node in the data structure to which the selected node was not previously linked; and also adjusting a weight of an existing link from the selected node, corresponding to the selected NOTAM, to another node in the data structure to which the selected node was previously linked. Modifying may also include deleting at least one link in the plurality of links; deleting at least one node in the plurality of nodes and deleting any links connected to the at least one node; and adjusting a weight of at least one link in the plurality of links.

Continuing the optional steps, at step 214, the prioritized order may be updated according to the modified data structure. Step 214 may be issued prior to commanding the NOTAMs to be displayed at step 206 so that the updated order is displayed.

The methods of FIG. 2 may be yet further modified. For example, the method of FIG. 2 may be performed with respect to the operation of an aircraft. In this case, the method of FIG. 2 may be performed entirely on the aircraft using aircraft parts, such as a processor, software parts, etc., may be performed entirely on a ground control system, or a combination thereof.

When the method of FIG. 2 is performed with respect to the operation of an aircraft, the method may also include receiving additional data related to operation of the aircraft. For example, step 210 may take the form of a pilot inputting a change to a priority assigned to a NOTAM. The additional data may be a newly transmitted NOTAM from an aviation regulatory agency. The additional data may be weather information, ground control reports, etc. Thus, the additional data may be selected from at least one of the group consisting of: a characteristic of the aircraft, a weather report, Automatic Dependent Surveillance Broadcast (ADS-B) data, and a phase of flight of the aircraft, airport information, additional NOTAMs, and others.

Thus, modifying the data at step 212 may take the form of associating ones of the additional data to ones of the nodes. The data structure is then modified, to form a modified data structure, by modifying the plurality of links based on the additional data, as described above. The prioritized order may be updated according to the modified data structure prior to commanding the NOTAMs to be displayed.

Receiving additional data may take the form of receiving a report that at least some of the additional data is no longer relevant. In this case, the data structure may be modified, to form a second modified data structure, by further modifying the links based on the report. In this case, the prioritized order may be updated according to the second modified data structure prior to commanding the NOTAMs to be displayed.

Still other variations of the method of FIG. 2 are possible. for example, the data structure may be concurrently updated as additional NOTAMs and additional information is received by the computer processor, forming a concurrently modified data structure. In other words, the data structure may be updated "in real time;" which is defined as updating the data structure as soon as new information or user input is received. Thus, the method also contemplates updating the prioritized order according to the concurrently modified data structure prior to commanding the plurality of NOTAMs to be displayed.

Thus, for example, if the additional data is selected from at least one of the group consisting of: a characteristic of the aircraft, a weather report, Automatic Dependent Surveillance Broadcast (ADS-B) data, and a phase of flight of the aircraft, airport information, then concurrently updating the data structure may further include performing at least one action based on at least one of the additional NOTAMs and the additional information, and the action may be selected from the group consisting of: adding a node to the data structure, deleting a node from the data structure, modifying a node in the data structure, adding a link in the data structure, deleting a link from the data structure, and changing a weight of a link in the data structure. Still other variations are possible.

Figure 3:
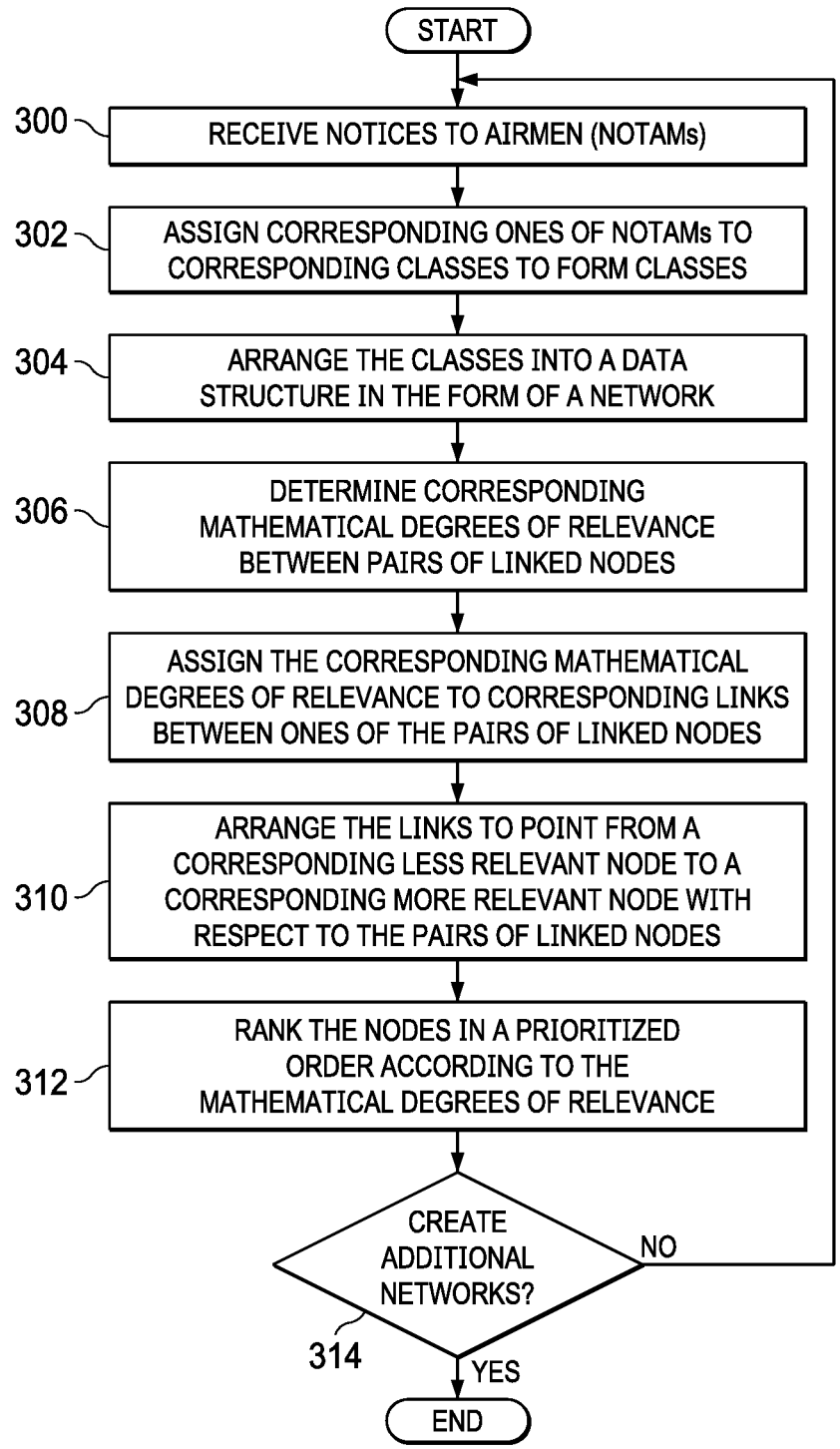
FIG. 3 shows a method for building a data structure to present ranked NOTAMs, in accordance with one or more embodiments.

Attention is now turned to FIG. 3. FIG. 3 shows a method for building a data structure to present ranked NOTAMs, in accordance with one or more embodiments. The method shown in FIG. 3 may be implemented using the system shown in FIG. 1. The method shown in FIG. 3 may be characterized as a method of building a network data structure, such as network (108) of FIG. 1. Thus, the method shown in FIG. 3 may be implemented prior to or concurrently with performing the method of using the data structure shown in FIG. 2. The method shown in FIG. 3 is performed by a computer processor, though the term "a computer processor" contemplates not only a single processor, but also multiple computer processors in a possibly distributed computing environment.

At step 300, notices to airmen (NOTAMs) are received. The NOTAMs may be received via wired or wireless communication devices from a variety of sources, as described above. At step 302, corresponding ones of NOTAMs are assigned to corresponding classes. The assignment of NOTAMs may be performed by defining a class as a NOTAM, defining a class and assigning a pointer from the class to the NOTAM, storing a NOTAM within a class, and possibly according to other programming techniques.

At step 304, the classes are arranged into a data structure in the form of a network. Arranging the classes may include arranging the classes as nodes and forming links by connecting ones of nodes to at least one other node in the network via at least one link. Additionally, corresponding weights may be assigned to the links. Nodes may have more than one link pointing into or out of any given node.

At step 306, corresponding mathematical degrees of relevance are determined between pairs of linked nodes. The degrees of relevance may be determined using a number of different methods. For example, user input, that designates the degrees of relevance, may be received from a data input device. In a more specific example, a human subject matter expert may assign numbers to the NOTAMs to indicate their relative importance to a particular aircraft operator, or perhaps to a particular flight for that aircraft operator. In still another example, a machine learning model may be used to predict a relevance of one NOTAM relative to another. In yet another example, computer rules may be applied to the NOTAMs to automatically assign numbers indicating node relevance relative to other nodes. In a more specific example, as a result of client input, weather-based NOTAMs may be assigned a higher relevance number than other types of NOTAMs. Still other techniques for determining the relevance of NOTAMs relative to each other, and hence nodes in the data structure, may be used.

At step 308, the corresponding mathematical degrees of relevance are assigned to corresponding links between ones of the pairs of linked nodes. In other words, each link is assigned a degree of relevance relative to other nodes in the data structure. Assignment of a degree of relevance to a link may be performed according to a number of different methods. For example, corresponding ones of the NOTAMs may be assigned to a corresponding class using Q-codes as bases for the classes. In another example, a link may take the form of a sub-data structure which stores the number. The degree of relevance may be assigned to a link via metadata or via a pointer which points to the degree of relevance stored elsewhere. Other computer programming techniques for assigning the mathematical degrees of relevance to corresponding links may be used.

At step 310, the links are arranged to point from a corresponding less relevant node to a corresponding more relevant node with respect to the pairs of linked nodes. Arranging the links may be performed by assigning a directionality to a link based on a difference between mathematical degrees of relevance between nodes. Other computer programming techniques may also be used to assign directionality to the links in the network data structure.

At step 312, the nodes are ranked in a prioritized order according to the mathematical degrees of relevance. The nodes may be ranked by sorting the nodes in descending mathematical order. The network data structure may be preserved and the nodes reproduced in a second data structure which simply lists the nodes from a highest degree of relevance to a lowest degree of relevance.

Ranking may also be accomplished by other methods. For example a page ranking algorithm may assign an importance value to each of the class nodes. The algorithm may assign high values to nodes with many in-links. The classes and their respective NOTAMs can subsequently be presented in a prioritized order according to their rank value. The method of FIG. 3 may terminate thereafter.

Optionally, at step 314, a decision may be made whether to create additional networks (i.e., additional network data structures). If so (a "yes" determination at step 314), then the process may return to step 300 and repeat. In this manner, different sets of classes may be arranged into different data structures forming different networks which include the network formed initially at steps 300 through 312. Ones of the different networks contain different domains of nodes. The different domains of nodes are selected from at least one of the group consisting of: a user group, a flight phase, an aircraft operator, and an aircraft type. Other domains may exist, such as but not limited to a ground controller domain which displays NOTAMs more relevant to ground controllers, and possibly many others. If no additional networks are to be created (a "no" determination at step 314), then the process may terminate.

While the various steps in the flowcharts shown in FIG. 2 and FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

The following example shown in FIG. 4 through FIG. 7 is for explanatory purposes only and not intended to limit the scope of the claimed invention. FIG. 4 through FIG. 7 should be considered together. The example shown in FIG. 4 through FIG. 7 may be built and used according to the system and methods shown in FIG. 1 through FIG. 3.

FIG. 4 shows an example of a list of classes NOTAMs, in accordance with one or more embodiments. Each NOTAM class is assigned a class identifier (400) (or "ID") and a description (402). Thus, for example, NOTAM class (404) is associated with an identifier "p777" and has a description in the form of text stating, "air traffic procedures, e.g. arrival procedures." The class identifier (400) may be assigned by the aviation regulatory agency.

Later, after the NOTAMs have been organized or ranked according to the procedures described with respect to FIG. 1 through FIG. 3, a relevancy ranking may also be displayed. Thus, a user may see at a glance which NOTAMs have higher relevancy than others. A user may then move one NOTAM higher in the priority rank, which may result in a complete reorganization of all NOTAMs in terms of relevancy with respect to each other as the underlying network data structure changes in response to receiving the user input.

Figure 5:
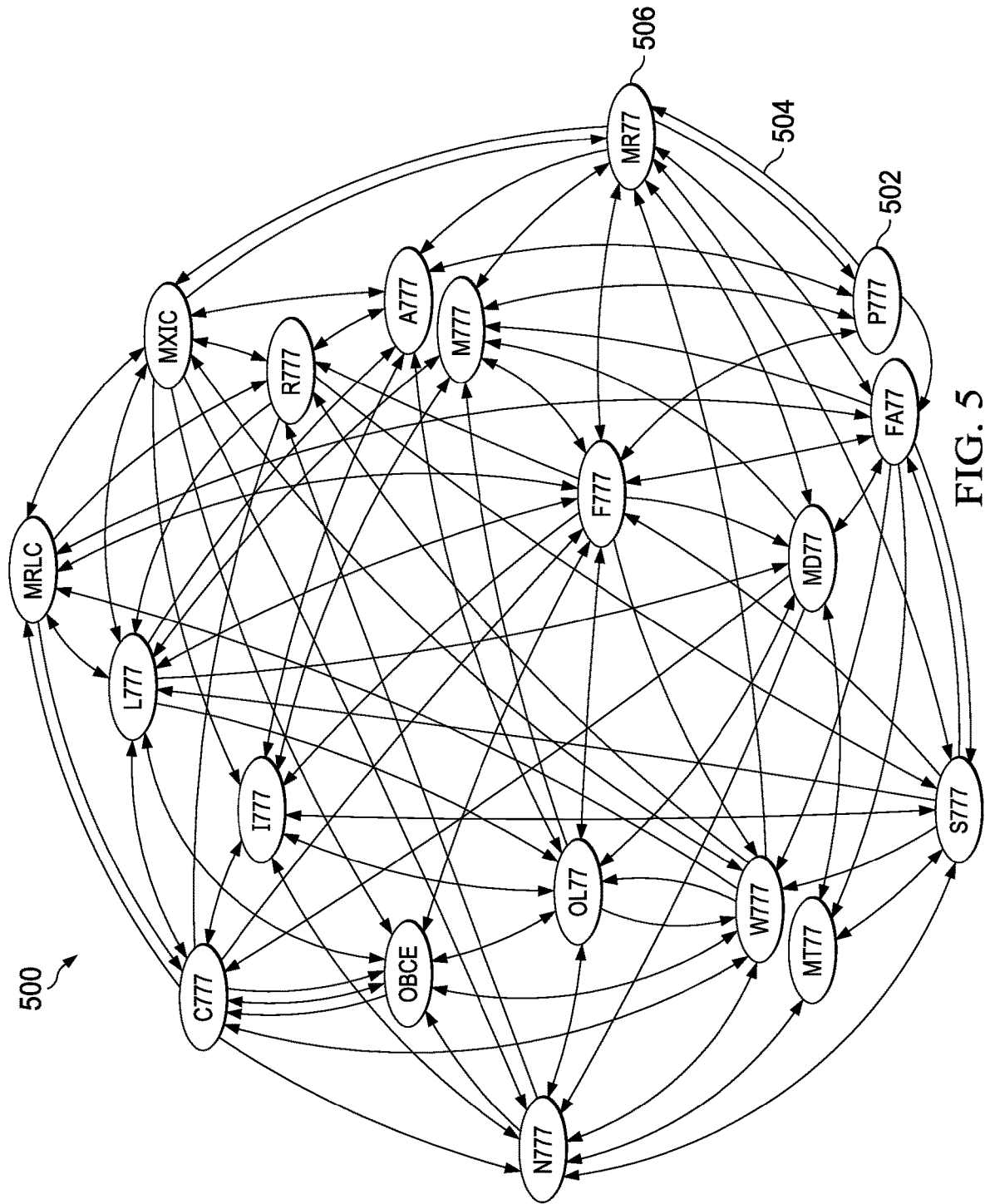
FIG. 5 shows an example of a network data structure, in accordance with one or more embodiments.

FIG. 5 shows an example of a network data structure, in accordance with one or more embodiments. The network (500) shown in FIG. 5 is an example of the network (108) described with respect to FIG. 1, used with respect to FIG. 2, and built with respect to FIG. 3. The network (500) shown in FIG. 5 is built using the NOTAMs shown in FIG. 4.

As can be seen, the network (500) is composed of nodes, such as node (502) that correspond to a particular NOTAM. Each node is identified by an identifier. Thus, for example, node p777 (502) corresponds to NOTAM (404) in FIG. 4.

Each of the nodes in the network (500) is associated with at least one link, and in this particular example each of the nodes is associated with multiple links, possibly with multiple links between two nodes. For example, link (504) connects node p777 (502) to node mr77 (506). As can be seen in FIG. 5, link (504) points from node p777 (502) to node mr77 (506), indicating that node mr77 (506) has a higher relevance than node p777 (502). Note that the arrow representing the link (504) could change directionality in response to updated input, in which case the node p777 (502) would become more relevant than node mr77 (506).

When multiple links connect two nodes, an indication is given that two nodes are evaluated for relevancy with respect to each in multiple domains of information. For example, node p777 (502) may be relevant to node mr77 (506) because both nodes are related to weather conditions. In addition, node p'777 (502) may be relevant to node mr77 (506) because both nodes are also particularly applicable to a class of aircraft. In this case, the NOTAM associated with node p777 (502) states a procedure during a particular weather condition and the NOTAM associated with node mr77 (506) states runway characteristics in that weather condition. Different links connecting two nodes may have different directionalities. In other words, node p'777 (502) may be more relevant than node mr77 (506) in one information domain, but may be less relevant than node mr77 (506) in a different information domain.

When two nodes are connected by multiple links, possibly with different directionalities for the multiple links, then a combined relevancy may be determined between the two nodes. For example, the overall relevancy between node p777 (502) and node mr77 (506) may be increased because the nodes are linked to each other in multiple domains. Then, when ranking the nodes, the increased relevancy may be used to determine the relative importance of node p777 (502) relative to node mr77 (506) relative to other nodes in the network (500).

Figure 6:
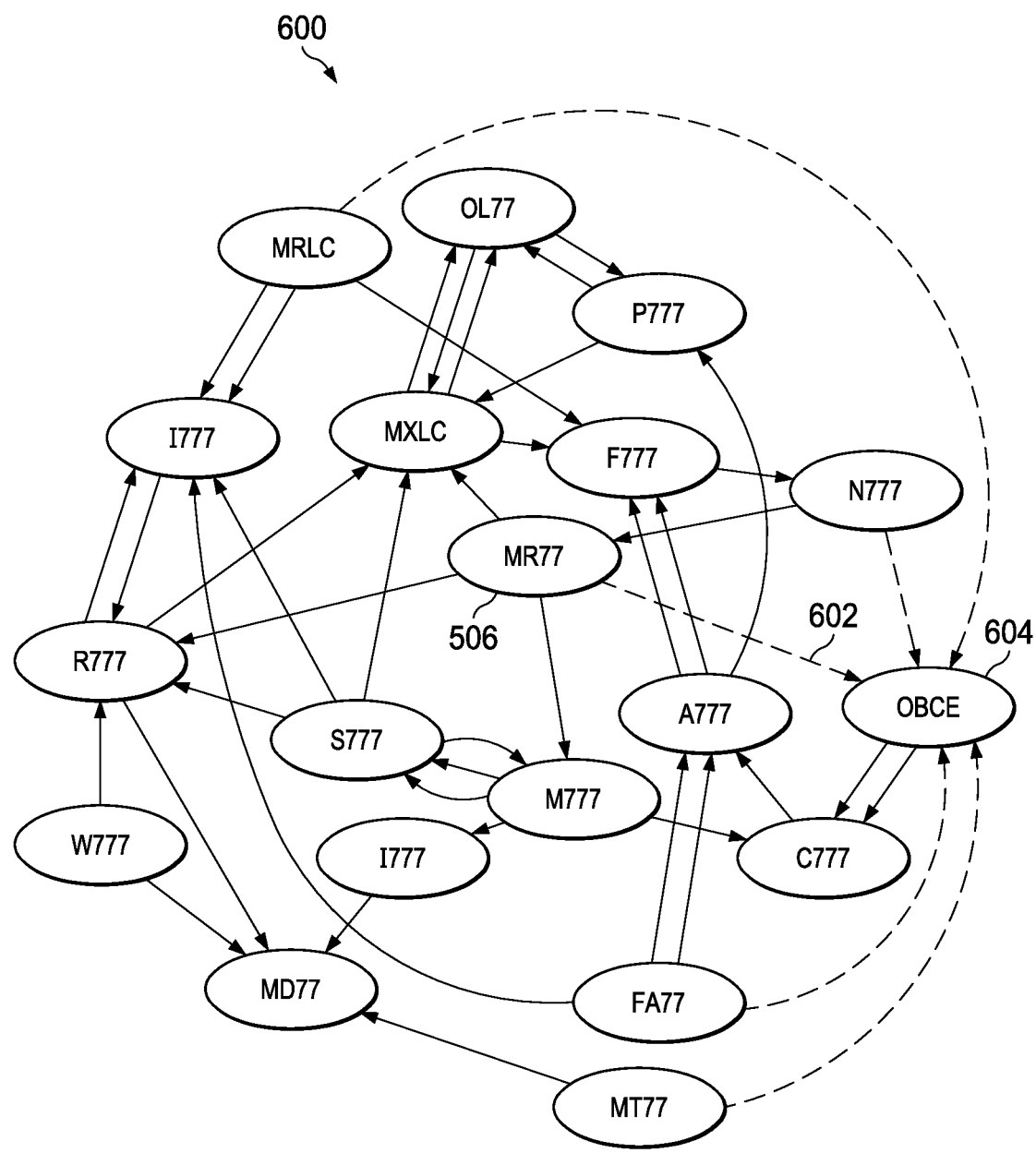
FIG. 6 shows an example of reorganizing links in the network data structure of FIG. 5, in accordance with one or more embodiments.

FIG. 6 shows an example of reorganizing links in the network data structure of FIG. 5, in accordance with one or more embodiments. The updated network (600) shown in FIG. 6 may be formed from the network (500) shown in FIG. 5.

In this example, the dashed arrows, such as dashed arrow (602), indicate additional links formed between nodes. In particular, dashed arrow (602) indicates a new link between node mr77 (506) (also present in FIG. 5) and node abce (604). Other links may also be added, possibly in different directions, to indicate the changed relationships among the various nodes in the updated network (600).

Figure 7:
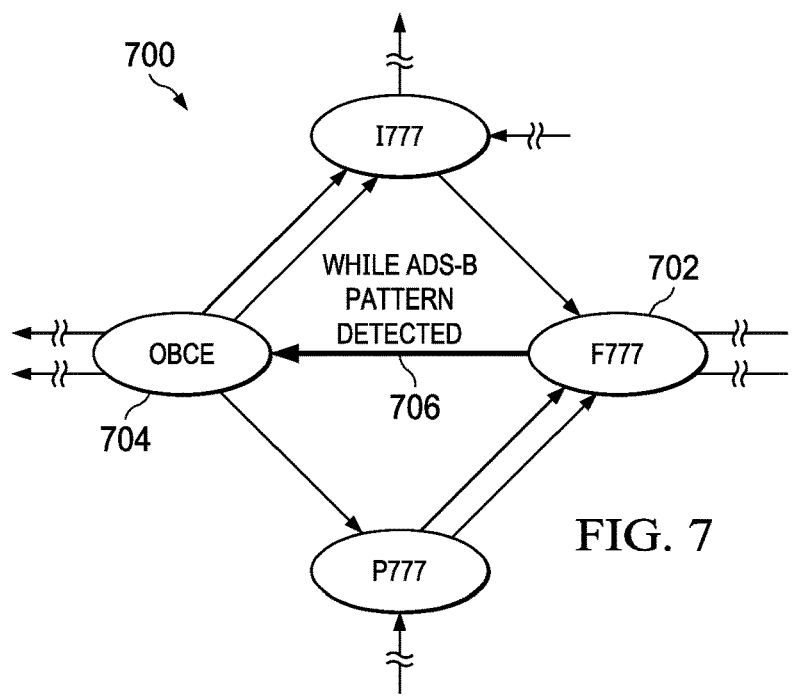
FIG. 7 shows an example of changing link weights in the network data structure of FIG. 5, in accordance with one or more embodiments.

FIG. 7 shows an example of changing link weights in the network data structure of FIG. 5, in accordance with one or more embodiments. The second updated network (700) shown in FIG. 7 may be formed from the network (500) shown in FIG. 5 and/or the updated network (600) shown in FIG. 6. Note that the term "second" in "second updated network (700)" does not necessarily indicate that the second updated network (700) was created subsequent to the updated network (600), but rather only to indicate that the second updated network (700) may be different than the updated network (600).

In the example of FIG. 7, the link between node f777 (702) and node obce (704) already exists, possibly in the network (500) shown in FIG. 5. However, new information is made available which indicates that the relative relevance between node f777 (702) and node obce (704) has changed. For example, the node f777 (702) is now less relevant than node obce (704) relative to the network (500) shown in FIG. 5. As a result, the weight assigned to the link (706) is decreased. The decreased weight may cause the direction of the link (706) to change from pointing towards the node obce (704) to pointing towards the node f777 (702). The opposite case may occur if the weight were to increase rather than decrease.

However, the direction of the link (706) might not change. For example, the relevancy of one node to the other may increase in value, thereby indicating a stronger degree of relevancy. The stronger degree of relevancy will factor into an increased probability that one of the node f777 (702) or the node obce (704) will be ranked higher than the other node.

In use, when the system is in place and NOTAMs are shown to the users in a prioritized way, user interaction data can be gathered for an automatic adaptation of the network and the resulting ranking. For example, whenever a user interacts with a NOTAM by moving it within the pre-prioritized list or by flagging it as important or unimportant, this information can be fed back into the network by adding additional links or by adjusting the weight of existing links according to the performed action. By doing so, the network learns the user's preferences and adapts itself more and more to its user, and accordingly the prioritization becomes more relevant to a single user or a user group (if feedback is aggregated over multiple users) over time.

The network can furthermore be adjusted by using additional data like aircraft characteristics, weather, ADS-B data or any other information that has an impact on the relevance of certain NOTAM classes in certain situations. Static information like aircraft characteristics can be used to add fixed links or link weights to the network, whereas dynamic information like weather or ADS-B can be used to add temporary links to the network or to increase or decline link weights for the amount of time the information is relevant.

FIG. 7 may show an example of a temporary increase of link weight, rather than decreased link weight as described above. Thus, node obce (704) contains NOTAMs related to obstacles, which is ranked low (indicated by darker color) because obstacle NOTAMs often are not relevant. If ADS-B data indicates unusual flight patterns in a specific region, then a relevant obstacle in that region is indicated. As long as the pattern is detected, the in-links to the obstacle class receive a higher weight, which results in a higher rank value for the class forming the node. For the users, that obstacle's NOTAMs are presented sooner in the list, thus increasing making it less time consuming for a user to find the NOTAM relating to an obstacle.

The examples of FIG. 4 through FIG. 7 are exemplary only. Many other examples are possible. Thus, the example of FIG. 4 through FIG. 7 should not be considered exclusive or necessarily limiting of the claimed invention.

FIG. 8A and FIG. 8B show an example of a computer in a distributed network environment, in accordance with one or more embodiments. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (808) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (808) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (812), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, by a computer processor, a data structure comprising a network having a plurality of nodes linked by a plurality of links,
wherein the plurality of nodes comprise corresponding classes representing corresponding distinct notices to airmen (NOTAMs) among a plurality of NOTAMs,
wherein the plurality of nodes are pre-ranked in a prioritized order according to the pre-determined mathematical degree of relevance,
wherein the plurality of nodes are linked to at least one other node in the plurality of nodes,
the plurality of links represent corresponding pre-determined mathematical degrees of relevance between pairs of linked nodes in the plurality of nodes, and
the plurality of links point from a corresponding less relevant node to a corresponding more relevant node with respect to the pairs of linked nodes;
receiving, by the computer processor, a request to display the plurality of NOTAMs on a display device;
retrieving, by the computer processor, the plurality of NOTAMs associated with the plurality of nodes in the prioritized order; and
commanding, by the computer processor, the plurality of NOTAMS to be displayed on the display device in the prioritized order.

2. The method of claim 1, further comprising:
receiving user input indicating that a selected NOTAM is of higher importance relative to a pre-selected rank for the selected NOTAM;
modifying the data structure, to form a modified data structure, by modifying the plurality of links according to an updated degree of relevance; and
updating the prioritized order according to the modified data structure prior to commanding the plurality of NOTAMs to be displayed.

3. The method of claim 2, wherein modifying the data structure comprises:
adding an additional link from a selected node, corresponding to the selected NOTAM, to another node in the data structure to which the selected node was not previously linked.

4. The method of claim 2, wherein modifying the data structure comprises:
adjusting a weight of an existing link from a selected node, corresponding to the selected NOTAM, to another node in the data structure to which the selected node was previously linked.

5. The method of claim 2, wherein modifying the data structure comprises:
adding an additional link from a selected node, corresponding to the selected NOTAM, to another node in the data structure to which the selected node was not previously linked; and
adjusting a weight of an existing link from the selected node, corresponding to the selected NOTAM, to another node in the data structure to which the selected node was previously linked.

6. The method of claim 1, further comprising:
receiving additional data related to operation of an aircraft;
associating ones of the additional data to ones of the plurality of nodes;
modifying the data structure, to form a modified data structure, by modifying the plurality of links based on the additional data; and
updating the prioritized order according to the modified data structure prior to commanding the plurality of NOTAMs to be displayed.

7. The method of claim 6, wherein the additional data is selected from at least one of the group consisting of: a characteristic of the aircraft, a weather report, Automatic Dependent Surveillance Broadcast (ADS-B) data, and a phase of flight of the aircraft, airport information.

8. The method of claim 6, further comprising:
receiving a report that at least some of the additional data is no longer relevant;
modifying the data structure, to form a second modified data structure, by further modifying the plurality of links based on the report; and
updating the prioritized order according to the second modified data structure prior to commanding the plurality of NOTAMs to be displayed.

9. The method of claim 8, wherein modifying comprises:
deleting at least one link in the plurality of links.

10. The method of claim 8, wherein modifying comprises:
deleting at least one node in the plurality of nodes; and
deleting any links connected to the at least one node.

11. The method of claim 8, wherein modifying comprises:
adjusting a weight of at least one link in the plurality of links.

12. The method of claim 8, wherein modifying comprises:
deleting at least one link in the plurality of links;
deleting at least one node in the plurality of nodes;
deleting any links connected to the at least one node; and
adjusting a weight of another link in the plurality of links.

13. The method of claim 1, further comprising:
concurrently updating the data structure as additional NOTAMs and additional information is received by the computer processor to form a concurrently modified data structure; and
updating the prioritized order according to the concurrently modified data structure prior to commanding the plurality of NOTAMs to be displayed.

14. The method of claim 13, wherein:
the additional data is selected from at least one of the group consisting of: a characteristic of the aircraft, a weather report, Automatic Dependent Surveillance Broadcast (ADS-B) data, and a phase of flight of the aircraft, airport information,
concurrently updating the data structure further comprises performing at least one action based on at least one of the additional NOTAMs and the additional information, and
the action is selected from the group consisting of: adding a node to the data structure, deleting a node from the data structure, modifying a node in the data structure, adding a link in the data structure, deleting a link from the data structure, and changing a weight of a link in the data structure.

15. A method comprising:
receiving, at a computer processor, a plurality of notices to airmen (NOTAMs);
assigning corresponding ones of NOTAMs in the plurality of NOTAMs to corresponding classes to form a plurality of classes;
arranging the plurality of classes into a data structure comprising a network, wherein arranging the plurality of classes comprises:
arranging the plurality of classes as a plurality of nodes;
forming a plurality of links by connecting ones of nodes in the plurality of nodes to at least one other node in the network via at least one link;
determining corresponding mathematical degrees of relevance between pairs of linked nodes among the plurality of nodes;
assigning the corresponding mathematical degrees of relevance to corresponding links between ones of the pairs of linked nodes;
arranging the plurality of links to point from a corresponding less relevant node to a corresponding more relevant node with respect to the pairs of linked nodes, and
ranking the plurality of nodes in a prioritized order according to the mathematical degrees of relevance.

16. The method of claim 15, wherein assigning corresponding ones of the NOTAMs to a corresponding class comprises using Q-codes as bases for the plurality of classes.

17. The method of claim 15, wherein determining the corresponding mathematical degrees of relevance comprises receiving user input from a data input device.

18. The method of claim 15, further comprising:
arranging the plurality of classes into a plurality of different data structures comprising a plurality of different networks which include the network, wherein ones of the plurality of different networks contain different domains of nodes.

19. The method of claim 15, wherein the different domains of nodes are selected from at least one of the group consisting of: a user group, a flight phase, an aircraft operator, and an aircraft type.

20. A system for organizing notices to airmen (NOTAMs), the system comprising:
a computer processor;
a data repository in communication with the computer processor, wherein the data repository stores:
a plurality of NOTAMs,
a network comprising a plurality of nodes comprising a plurality of classes to which are assigned the plurality of NOTAMs,
a plurality of links linking the plurality of nodes, wherein ones of the plurality of links connect at least two nodes of the plurality of nodes,
a plurality of mathematical degrees of relevance assigned to ones of the plurality of links, and
a ranking that establishes the plurality of nodes in a prioritized order according to the mathematical degrees of relevance;
a data structure construction engine executable by the computer processor and configured to:
assign the plurality of NOTAMs to the plurality of classes;
arrange the plurality of nodes into the network;
determine the mathematical degrees of relevance;
assign the plurality of links to corresponding ones of the plurality of nodes such that corresponding ones of the plurality of links point from a corresponding less relevant node to a corresponding more relevant node with respect to any two selected linked nodes in the plurality of nodes; and
rank the plurality of nodes into the ranking;
a NOTAM presentation engine executable by the computer processor and configured to:
receive a request to display the plurality of NOTAMs on a display device;
retrieve the plurality of NOTAMs associated with the plurality of nodes in the prioritized order; and
command the plurality of NOTAMS to be displayed on the display device in the prioritized order; and
the display device for displaying the plurality of NOTAMS according to the ranking.

21. The system of claim 20 further comprising:
a communication device configured to receiving additional data related to operation of an aircraft; and
wherein the data structure construction engine is further executable by the computer processor to:
associate ones of the additional data to ones of the plurality of nodes;
modify the data structure, to form a modified data structure, by modifying the plurality of links based on the additional data; and
update the prioritized order according to the modified data structure prior to commanding the plurality of NOTAMs to be displayed on the display device.

* * * * *